Patented Jan. 1, 1924.

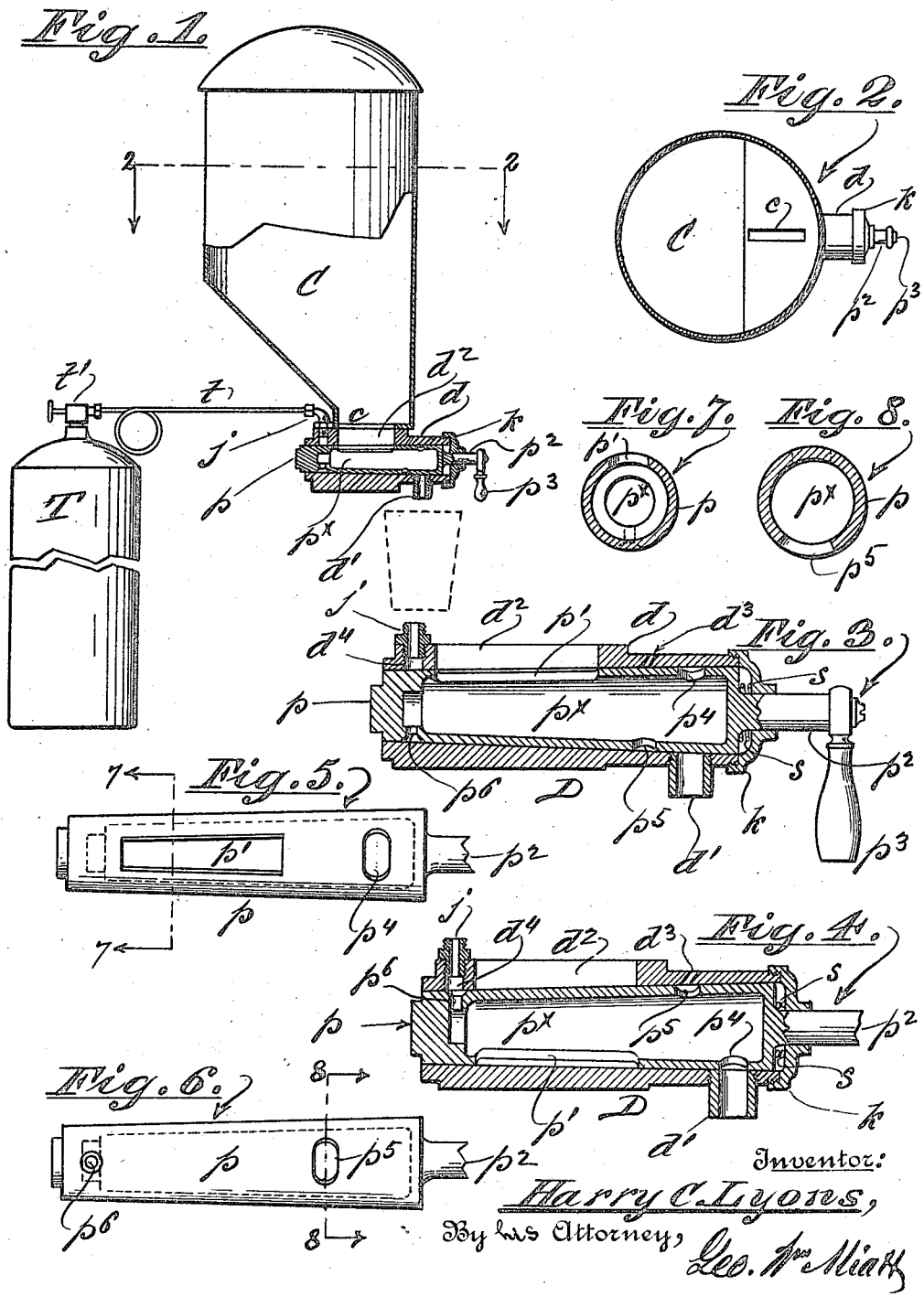

1,479,103

UNITED STATES PATENT OFFICE.

HARRY C. LYONS, OF NEW YORK, N. Y.

DISPENSING MEANS FOR AERATED BEVERAGES.

Application filed May 17, 1922. Serial No. 561,575.

*To all whom it may concern:*

Be it known that I, HARRY C. LYONS, a citizen of the United States, and a resident of the borough of Manhattan, city, county, and State of New York, have invented certain new and useful Improvements in Dispensing Means for Aerated Beverages, of which the following is a specification.

My improvements relate, in a general way, to the type of apparatus heretofore devised by myself, for the dispensing of beverages containing extracts of cocoa, such as chocolate, cocoa, etc., as set forth in Letters Patent No. 1,367,823, and also in my concurrent applications, Serial No. 512,719, filed November 4, 1921 and Serial No. 522,779 filed, December 16, 1921, in which milk, diluted or otherwise, is used as a vehicle to take up, flush out, and remove the heavier constituents of the beverage from the measuring chamber of a dispensing faucet.

I have found by experimental investigation that the same principle of simultaneous discharge of both the lighter and heavier constituents of a beverage through and from a measuring faucet may be advantageously employed in the dispensing of aerated beverages such as soda water, so called, and analogous concoctions,—the lighter, gas charged constituents being utilized as a vehicle for the heavier syrup or flavoring element.

In my aforesaid concurrent application Serial No. 522,779, my liquid vehicle, or, in other words, the more fluent constituent part of the beverage is stored in a container or compartment separate from that in which the heavier or more viscid, semi-fluid constituent is stored,—both constituent beverages drawn off and discharged simultaneously through and from a measuring faucet which prescribes the quantity of the heavier constituent served with each portion or drink dispensed.

My present invention consists essentially in means for dispensing aerated beverages in substantially the same manner, and by practically the same above stated means, in that a measuring faucet for a flavoring syrup or fluid extract, is utilized also for the discharge of the aerated liquid, which functions also as a vehicle for the heavier constituent of the beverage,—the main distinction being that whereas heretofore the flow of the liquid vehicle has been affected by gravity, in the present case I utilize the inherent gaseous pressure of the carbonated water to force such liquid vehicle through the measuring chamber of the dispensing faucet, and incidentally to flush out, and insure the discharge of the syrup or fluid extract from the measuring chamber of said dispensing faucet,—said carbonated water under pressure being derived from a commercial tank thereof as supplied to the trade in a manner well known in the art of dispensing aerated beverages,—the distinctive feature of my present invention consisting in connecting the discharge duct of said gas tank directly with the vehicle inlet port of a measuring and dispensing faucet essentially the same in construction and operation as that shown and described in my last named concurrent application Serial No. 522,779.

By this means I am enabled to dispense soda water and other aerated liquid compound beverages in a simple and expeditious manner, and with economy in both time and labor, at the same time insuring a uniformity of product in that the heavier constituent, the flavoring syrup or fluid extract, is always the same in quantity for each portion of beverage dispensed and the aerated liquid vehicle is automatically mixed therewith while functioning also as a flush to wash out the mixing chamber; whereas, heretofore, and under present conditions of retail trade in aerated beverages, it is customary to first draw off into a glass a quantity of fluid syrup or fluid extract from a reservoir thereof, and then inject the carbonated water into the contents of the glass by means of and through a separate discharge spout connected with a charged tank of carbonated water. Or, in other words under conditions obtaining up to the present time in retailing and serving aerated beverages two separate operations are indispensable in mixing and dispensing a glass of soda water,—i. e., the preliminary draining off of the flavoring syrup or fluid extract from one source and faucet into an individual service container or glass, and the subsequent injection thereinto of the carbonated water under pressure derived from another source and faucet, necessitating the manipulation of two separate dispensing faucets, sometimes positioned a considerable distance apart. Obviously if both constituents of an aerated beverage can be drained off simultaneously through a single dispensing faucet, the retailing thereof will be facilitated, and the labor and time involved practically reduced one half as compared with the old method, at the same time rendering the service more accurate and uniform, the danger of accident or waste being furthermore reduced to a minimum and a maximum of efficiency of service being attained.

In the accompanying drawings,

Fig. 1, is a representation, more or less diagrammatic, of the essential features of my invention:

Fig. 2, is a horizontal section taken upon plane of line 2—2, Fig. 1:

Fig. 3, is a central longitudinal sectional elevation of the dispening faucet shown in Fig. 1, but upon a larger scale, the valve plug being represented as in the same, or closed, position:

Fig. 4, is a view like unto Fig. 3, with the valve plug turned into position for discharge.

Fig. 5, is a view of the normally upper side of the valve plug:

Fig. 6, is a view of the normally under side of the valve plug:

Fig. 7, is a transverse section taken upon plane of line 7—7, Fig. 5:

Fig. 8, is a transverse section taken upon plane of line 8—8, Fig. 6.

C, represents a container for flavoring syrup or fluid extract of any kind to be used as a constituent part of an aerated beverage, said container being formed with a discharge port $c$, communicating with, and closed by, a dispensing faucet D, the casing $d$, of which is attached to the lower portion of the container.

The valve plug $p$, of this dispensing faucet D is slightly conical, tapering rearward, and is held to its concavo-conoidal seat in the casing $d$, by a spring $s$, interposed between its forward extremity and a cap $k$, screwing onto the outer end of the valve casing $d$, as shown more particularly in Figs. 1, 3 and 4. Near its forward extremity said casing $d$, is formed with the discharge spout $d'$.

The valve plug $p$, is formed with an elongated inlet port $p'$, on its normally upper side, which, when the valve is closed to the discharge spout $d'$ coincides with the inlet $d^2$, as shown in Figs. 1 and 4, thereby admitting the flavoring syrup or liquid extract from the lower part of the container C into the measuring chamber $p^x$, of said valve plug $p$, as indicated more particularly in Fig. 1. The valve plug $p$, is, of course, provided with the usual stem $p^2$ and handle $p^3$, to facilitate manipulation; a half turn of said plug in either direction sufficing to open or close faucet, as the case may be.

On the same side of the valve plug $p$, as the inlet port $p'$, is the discharge port $p^4$, which, when the plug is reversed or turned into position for discharge, coincides with the spout $d^2$, of the casing $d'$, as shown in Fig. 4. When the valve plug is thus reversed from normal position, its rear inlet port $p^6$, coincides with the fluid vehicle inlet port $d^4$, in the casing $d'$, as also shown in said Fig. 4, said inlet port $p^6$, being on the side of the valve plug opposite to that on which the inlet port $p'$, and discharge port $p^4$, are situated.

The fluid vehicles port $d^4$, is provided with a coupling joint $j$, for connection with the discharge tube $t$, of a tank T, containing water or liquid charged with carbonic acid gas in a manner well known in the art of providing for the aerating of beverages, as in conjunction with soda fountains, so called, or for analogous uses and purposes,—said tanks T being provided each with a sealing valve $t'$, and being regular articles of commerce supplied to the trade ready for use upon coupling up with a discharge spout, the latter in the present case consisting of the aforesaid coupling joint $j$, connected with the fluid vehicle inlet port $d^4$ in the casing $d$, of the dispensing faucet D, as indicated in Fig. 1, of the drawings. Hence, when the gas tank T is thus connected up with the coupling joint $j$, and the tank valve $t'$, is opened, whenever the valve plug $p$, is turned into discharge position as shown in Fig. 4, the gas-charged liquid vehicle will be admitted under pressure into the measuring chamber $p^x$, of the valve plug $p$ thereof insuring the flushing out of the latter, and the discharge of the heavier and less fluid syrup or liquid extract derived from the container C, and constituting, relatively speaking, the more dense and viscid constituent of the resultant compound beverage as delivered through the spout $d'$ of the faucet D, to a receptacle as in Fig. 1, positioned to receive it. Thus the measuring chamber $p^x$ of the faucet plug $p$ functions also as a mixing chamber for the constituents of the resultant aerated beverage.

By my present invention I not only effect a material saving in both time and labor of manipulation in the dispensing of aerated beverages, but I also attain a more perfect admixture and blending of the component parts thereof, owing to the mingling of said constituents in the measuring chamber $p^x$ and their discharge simultaneously under pressure through the spout $d'$ of the dispensing faucet D,—the pressure referred to being in excess of that of the atmosphere whereas heretofore in my bi-fluid dispensers the discharge through and from the common faucet has been effected by gravity only, rendering the said discharge relatively slow as compared with the discharge under pressure as herein set forth. Incidentally, it may be stated, that by thus utilizing the initial pressure of the gas-charged liquid vehicle I avoid the delay heretofore involved in draining off separately the viscid flavoring syrup or liquid extract from the container for reasons that are obvious.

For instance while there is under normal conditions of retail trade, ample time between service for the filling up of my measuring chamber $p^x$ in the dispensing faucet D, whenever the faucet plug $p$, is turned into position for discharge the liquid vehicle under pressure quickly mixes with, dilutes, and conveys off the heavier constituent in the measuring chamber $p^x$,—the relatively slow flow of the syrup or liquid extract, as heretofore drawn off separately from its container, being obviated, so that the complete aerated beverage may be dispensed in less time than that heretofore involved in obtaining alone the charge of flavoring syrup or liquid extract preparatory to the injection thereinto of the gas-charged liquid.

I have herein, for convenience of exemplification, shown and described the source of aerated liquid supply as consisting of a tank T, charged therewith, but such aerated liquid supply may be derived from a carbonator in a manner well known in the art, or by or from any equivalent source or means, as may be found most expedient in practice, the essential and distinctive feature of my invention in this respect being the utilization of an aerated liquid under pressure as a fluid vehicle for effecting the discharge of the heavier fluid constituent of a beverage through a common discharge spout, substantially in the manner and for the purposes herein set forth.

What I claim as my invention and desire to secure by Letters Patent is,

In a device for dispensing aerated beverages, a container for syrup, said container having an outlet communicating with the top of a tapering valve chamber, the top of said valve chamber having an inlet passage connected with a source of carbonated liquid, a discharge outlet on the lower side of said valve chamber, a tapering valve having a measuring chamber seated in said valve chamber, said valve having on one side an aperture adapted to connect the measuring chamber with the syrup outlet passage and a passage adapted to connect the measuring chamber with the discharge outlet and on the opposite side an aperture adapted to be in register with the inlet passage for carbonated water, said valve being free of obstructions at its smaller end, a removable cap on the larger end of said valve chamber, and spring means between said cap and the larger end of said valve for holding the latter to its seat.

HARRY C. LYONS.

Witnesses:
MARGARET HANSTEIN,
LILLIA MIATT CARTER.